United States Patent
He et al.

(10) Patent No.: US 10,448,061 B2
(45) Date of Patent: Oct. 15, 2019

(54) LIVE DATA BROADCAST METHOD AND APPARATUS

(71) Applicant: Tencent Technology (Shenzhen) Company Limited, Shenzhen (CN)

(72) Inventors: Yanchun He, Shenzhen (CN); Zhidong Zhang, Shenzhen (CN); Jing Lai, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/690,075

(22) Filed: Aug. 29, 2017

(65) Prior Publication Data

US 2017/0359599 A1    Dec. 14, 2017

Related U.S. Application Data

(63) Continuation-in-part of application No. PCT/CN2016/082058, filed on May 13, 2016.

(30) Foreign Application Priority Data

Aug. 5, 2015 (CN) .......................... 2015 1 0475982

(51) Int. Cl.
*H04N 21/2187* (2011.01)
*H04N 21/24* (2011.01)
(Continued)

(52) U.S. Cl.
CPC ......... *H04N 21/2187* (2013.01); *H04N 21/24* (2013.01); *H04N 21/4126* (2013.01);
(Continued)

(58) Field of Classification Search
CPC .. H04N 21/2187; H04N 21/24; H04N 21/442; H04N 21/4788; H04N 21/4126;
(Continued)

(56) References Cited

U.S. PATENT DOCUMENTS

| | | | |
|---|---|---|---|
| 2012/0174158 A1* | 7/2012 | Mowrey | H04N 21/4126 725/40 |
| 2014/0160223 A1 | 6/2014 | Bieselt et al. | |
| 2016/0360262 A1* | 12/2016 | Matejka | H04N 21/4331 |
| 2017/0019709 A1* | 1/2017 | Gaur | H04N 21/44209 |

FOREIGN PATENT DOCUMENTS

| | | |
|---|---|---|
| CN | 102421034 A | 4/2012 |
| CN | 102685563 A | 9/2012 |

(Continued)

OTHER PUBLICATIONS

Tencent Technology,ISR, PCT/CN2016/082058, Jul. 28, 2016, 2 pgs.

(Continued)

*Primary Examiner* — Yassin Alata
(74) *Attorney, Agent, or Firm* — Morgan, Lewis & Bockius LLP (57) ABSTRACT

A live data broadcast method is performed at a computer server that is communicatively coupled to a first terminal and a second terminal. The method includes: detecting, during live broadcast of content of a first application running in a foreground of the first terminal to the second terminal, that the first terminal switches the first application to run in a background of the second terminal; obtaining predetermined multimedia content associated with the live broadcast; sending instructions to the second terminal to play the predetermined multimedia content on the second terminal, the predetermined multimedia content being different from content of a second application running in the foreground; and communicating status updates related to the live broadcast with the first terminal and the second terminal, respectively.

18 Claims, 4 Drawing Sheets

Detect, during live broadcast of content of a first application running in the foreground of a first terminal to a second terminal, whether the first terminal switches the first application to run in the background — S202

Instruct to play predetermined multimedia content on the second terminal if it is detected that the first terminal switches the first application to run in the background, where the predetermined multimedia content is different from content of a second application running in the foreground after the first terminal switches the first application to run in the background — S204

(51) Int. Cl.
*H04N 21/442* (2011.01)
*H04N 21/4788* (2011.01)
*H04N 21/41* (2011.01)
*H04N 21/472* (2011.01)
*H04N 21/44* (2011.01)
*H04N 21/63* (2011.01)
*H04N 21/81* (2011.01)

(52) U.S. Cl.
CPC ..... *H04N 21/442* (2013.01); *H04N 21/44016* (2013.01); *H04N 21/472* (2013.01); *H04N 21/4788* (2013.01); *H04N 21/47217* (2013.01); *H04N 21/632* (2013.01); *H04N 21/8173* (2013.01)

(58) Field of Classification Search
CPC ....... H04N 21/47217; H04N 21/44016; H04N 21/472; H04N 21/632; H04N 21/8173
See application file for complete search history.

(56) References Cited

FOREIGN PATENT DOCUMENTS

| | | |
|---|---|---|
| CN | 102859480 A | 1/2013 |
| CN | 103747650 A | 4/2014 |
| CN | 104333769 A | 2/2015 |
| CN | 104333770 A | 2/2015 |
| CN | 104735524 A | 6/2015 |
| CN | 105007527 A | 10/2015 |

OTHER PUBLICATIONS

Tencent Technology, Written Opinion, PCT/CN2016/082058, dated Jul. 28, 2016, 6 pgs.
Tencent Technology, IPRP, PCT/CN2016/082058, Feb. 6, 2018, 7 pgs.

* cited by examiner

LIVE DATA BROADCAST METHOD AND APPARATUS

RELATED APPLICATIONS

This application is a continuation-in-part of PCT/CN2016/082058, entitled "LIVE DATA BROADCAST METHOD AND APPARATUS" filed on May 13, 2016, which claims priority to Chinese Patent Application No. 201510475982.4, filed with the State Intellectual Property Office of the People's Republic of China on Aug. 5, 2015, and entitled "LIVE DATA BROADCAST METHOD AND APPARATUS", both of which are incorporated herein by reference in their entirety.

FIELD OF THE TECHNOLOGY

The present disclosure relates to the terminal application field, and specifically to a live data broadcast method and apparatus.

BACKGROUND OF THE DISCLOSURE

Currently, as the live broadcast technology becomes more mature and content of real-time live broadcast becomes richer, network users start to gradually change the watching mode, and select to watch the live broadcast by means of a network.

However, there is an problem that cannot be neglected in related live broadcast technologies. During live broadcast of an application (for example, a game application) of a first terminal to a second terminal by a user, if it is detected that the live broadcast process of the first terminal is interrupted by an enabled third party application, that is, the third party application is switched to run in the foreground of the first terminal, the first terminal may select to switch the live game application to run in the background of the first terminal, or may select to directly terminate the live game application.

In the case in which the live broadcast process of the first terminal is interrupted by the enabled third party application, if the first terminal directly terminates the live game application, the second terminal cannot keep playing content of the live game application of the first terminal, affecting the smoothness of live data broadcast.

In addition, in the case in which the live broadcast process of the first terminal is interrupted by the enabled third party application, if the first terminal selects to switch the live game application to run in the background of the first terminal, the second terminal may display a pause screen of the live game application of the first terminal. In this case, the pause screen may be displayed on the second terminal for a long time, affecting the smoothness of live data broadcast.

In addition, in the case in which the live broadcast process of the first terminal is interrupted by the enabled third party application, if the first terminal selects to switch the live game application to run in the background of the first terminal, the second terminal may continue to play an operating process of the first terminal on the third party application (for example, a short message service (SMS) application). Such manner may easily cause disclosure of personal information (for example, content of an edited SMS in the SMS application), consequently, the security of live broadcast is relatively low.

For the problem that the smoothness of live broadcast is relatively poor after live content is interrupted, no effective solution is provided now.

SUMMARY

Embodiment of the present application provide a live data broadcast method and apparatus, to at least resolve a problem that the smoothness of live data broadcast is relative poor caused by adoption of a related live data broadcast manner.

According to one aspect of the embodiments of the present application, a live data broadcast method is provided, including: detecting, during live broadcast of content of a first application running in the foreground of a first terminal to a second terminal, whether the first terminal switches the first application to run in the background; and the operation of sending instructions to the second terminal to play the predetermined multimedia content on the second terminal if it is detected that the first terminal switches the first application to run in the background, the predetermined multimedia content being different from content of a second application running in the foreground after the first terminal switches the first application to run in the background.

According to another aspect of the embodiments of the present application, a live data broadcast apparatus is provided, including: a first detection unit, configured to detect, during live broadcast of content of a first application running in the foreground of a first terminal to a second terminal, whether the first terminal switches the first application to run in the background; and a first play unit, configured to instruct to play predetermined multimedia content on the second terminal if it is detected that the first terminal switches the first application to run in the background, the predetermined multimedia content being different from content of a second application running in the foreground after the first terminal switches the first application to run in the background.

In the embodiments of the present application, during live broadcast of content of a first application running in the foreground of the first terminal to a second terminal, a server detects, in real time, whether the first terminal switches the first application to run in the background, to instruct, in a timely manner, the second terminal to play predetermined multimedia content after detecting that the first terminal switches the first application to run in the background, so that the second terminal may replace a pause screen of the live first application or content of a second application running in the foreground of the first terminal by playing the predetermined multimedia content, thereby ensuring the smoothness of live broadcast after the live content is interrupted, and resolving the technical problem in the related technology that the smoothness of live broadcast is relatively poor after the live content is interrupted.

In addition, because the second terminal plays the predetermined multimedia content rather than the content running in the foreground of the first terminal after the live content is interrupted, disclosure of personal information of a user of the first terminal when the live content is interrupted may be avoided, thereby increasing data security when the live content is interrupted.

BRIEF DESCRIPTION OF THE DRAWINGS

The accompanying drawings described herein provide a further understanding of the present disclosure, and constitute a part of this application. Schematic embodiments of the present disclosure and explanations thereof are used to explain the present disclosure, but do not limit the present disclosure. In the drawings.

DESCRIPTION OF EMBODIMENTS

To better under the solutions of the present disclosure by a person skilled in the art, the following clearly and completely describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application without creative efforts shall fall within the protection scope of the present disclosure.

It should be noted that, the terms such as "first" and "second" in the specification, claims, and accompanying drawings of the present application are intended to distinguish similar objects but do not necessarily indicate a specific order or sequence. It should be understood that the data termed in such a way are interchangeable in proper circumstances, so that the embodiments of the present application described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those steps or modules, but may include other steps or units not expressly listed or inherent to such a process, method, system, product, or device.

Embodiment 1

According to this embodiment of the present application, an embodiment of a live data broadcast method is provided. The live data broadcast method may, but is not limited to, be applied to an application environment shown in FIG. 1. A terminal 106 is performing live broadcast of content of a first application running in the foreground of a terminal 102. During the live broadcast, and a server 104 detects, in real time, whether the terminal 102 switches the first application to run in the background. If it is detected that the terminal 102 switches the first application to run in the background, the terminal 106 is instructed to play predetermined multimedia content. The predetermined multimedia content is different from content of a second application running in the foreground after the terminal 102 switches the first application. Optionally, in this embodiment, the terminal may include, but is not limited to, any one of the followings: a mobile phone, a tablet computer, a notebook computer, a personal computer (PC), or a digital television. The foregoing description is only an example, which is not limited in this embodiment.

Figure 2:
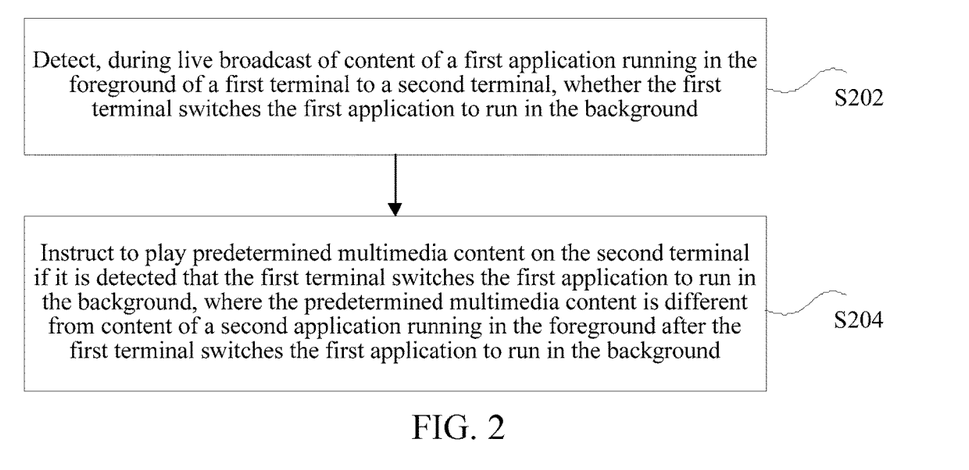
FIG. 2 is a flowchart of an optional live data broadcast method according to an embodiment of the present application.

In this embodiment of the present application, a live data broadcast method is provided to be performed at the server 104. As shown in FIG. 2, the method includes the following steps:

S202. Detect, during live broadcast of content of a first application running in the foreground of a first terminal to a second terminal, whether the first terminal switches the first application to run in the background.

In some embodiments, before performing the operation S202, the server 104 receives a request for live broadcast of content of the first application running on the first terminal 102 to the second terminal 106. The request includes a first user identifier associated with the first terminal 102 and a second user identifier associated with the second terminal 106. In some embodiments, the server 104 verifies whether such request should be granted or not by checking whether the first user identifier and the second user identifier are related to each other or not. For example, the first user identifier and the second user identifier are both members of a social networking platform (e.g., an instant messaging platform or an online gaming platform), they are deemed to be related to each other and therefore can use the live data broadcast function provided by the server when they are on each other's list of direct contacts.

S204. Instruct to play predetermined multimedia content on the second terminal if it is detected that the first terminal switches the first application to run in the background, where the predetermined multimedia content is different from content of a second application running in the foreground after the first terminal switches the first application to run in the background.

In some embodiments, the predetermined multimedia content is dynamically associated with the live broadcast based on information like the first application, the second application, the first terminal and the second terminal. For example, the predetermined multimedia content may be a song chosen by the user of the first or second terminal whenever a live data broadcast is interrupted. Or the server 104 may choose an image or video that is uniquely associated with the second application so that the user of the second terminal 106 is aware of the nature of the second application that interrupts the live data broadcast and understands how long the interruption might be based on the nature of the second application.

In some embodiments, while the predetermined multimedia content is played on the second terminal 106, the server 104 sends a status query to the first terminal 102 querying how long it takes the second application to be completed at the foreground of the first terminal. In response, the first terminal 102 may display a message on its screen prompting the user of the first terminal to provide an estimate without interrupting the second application. Alternatively, the first terminal 102 may provide an estimate by itself without prompting the user. For example, assuming that the second application is a telephone call with a third-party, the first terminal 102 may check its phone log for past phone calls with the third party and determine an average length of phone calls the user had with the third party in the past. If this is the first time that the user talks to the third party, the first terminal may check the average time of a first phone call that the user has with any third party. After receiving the response from the first terminal 102, the server 104 then submits a status update to the second terminal 106, notifying that how long it might take for the live data broadcast to be resumed. In some embodiments, the update also includes the nature of the second application running in the foreground of the first terminal 102 (e.g., a phone call or an instant messaging) to provide additional information for the user of the second terminal 106 with, e.g., the permission of the user of the first terminal 102.

In some embodiments, the server 104 conducts this status query and update between the first terminal 102 and the second terminal 106 based on a predefined schedule, periodically or not, to bring users at the first terminal 102 and the second terminal 106 aware of each other's status. For example, when the user at the second terminal 106 terminates playing the predetermined multimedia content on the second terminal 106, the sever 104 notifies the first terminal 102 accordingly so that the first terminal 102 (and its user) understands that the live data broadcast session is over and then delete the first application from its background accordingly.

Figure 1:
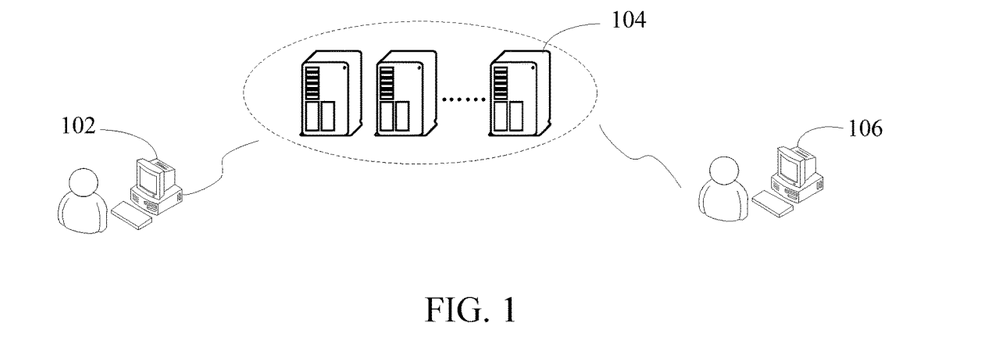
FIG. 1 is a schematic diagram of an application scenario of an optional live data broadcast method according to an embodiment of the present application.

Optionally, in this embodiment, the live data broadcast method may, but is not limited to, be applied to perform live broadcast of the content of the first application running in the foreground of the first terminal to the second terminal. As shown in FIG. 1, the server 104 detects, in real time, whether the first terminal (the terminal 102 in FIG. 1) switches the first application used for live broadcast to the background, to adjust, in a timely manner, content played on the second terminal (the terminal 106 in FIG. 1), so that the predetermined multimedia content is played on the second terminal to replace the content of the second application running in the foreground after the first terminal switches the first application, so as to resolve the problem in the related technology that the smoothness of live data broadcast is relatively poor caused by adoption of a related live data broadcast manner, thereby improving the smoothness during the live data broadcast.

It should be noted that, in this embodiment, in the related technology, during live broadcast of the content running in the foreground to the second terminal, the first terminal performs encoding and compression on the live content, and then provides, by using the server, the content to the second terminal for playing. That is, even though it is detected in the related technology that the first terminal switches the first application running in the foreground to run in the background, the second terminal still receives the content of the second application running in the foreground after the first terminal switches the first application, and continues live broadcast of the content of the second application running in the foreground of the first terminal. This may result in a problem that user information of the first terminal is disclosed to another user through the live broadcast. Therefore, in this embodiment, the server may instruct the second terminal to play predetermined multimedia data, to prevent the first terminal from disclosing the content of the second application running in the foreground to the second terminal, to ensure the security of live data broadcast.

Optionally, in this embodiment, the second application may include, but is not limited to: a system application, or a personal application. For example, the system application is a SMS application, and the personal application is an instant messaging application.

Optionally, in this embodiment, the predetermined multimedia content may include, but is not limited to, one of the followings: a predetermined image, a predetermined video, or predetermined audio. The predetermined multimedia content may be, but is not limited to, the content different from that of the first application. That is, the predetermined multimedia content is different from the content of the second application running in the foreground after the first terminal switches the first application, to avoid disclosure of information running in the foreground after the first terminal switches the first application to the background. Moreover, the predetermined multimedia content is different from the content of the first application, so that user experience may also be improved, to provide diversified selections for a user of the second terminal, so that the second terminal may perform smooth playing during the live data broadcast.

Optionally, in this embodiment, the manner of instructing the second terminal to play the predetermined multimedia content includes at least one of the followings:

(1) sending the predetermined multimedia content to the second terminal for playing; or (2) sending a play address of the predetermined multimedia content to the second terminal; or (3) sending a control instruction to the second terminal, where the control instruction is used to instruct the second terminal to obtain the predetermined multimedia content from a predetermined play address.

That is, the predetermined multimedia content may, but is not limited to, be pushed by the server. A pushed data form may include at least one of the followings: directly pushed multimedia content or a play address of pushed multimedia content. The predetermined multimedia content may, but is not limited to, be directly obtained by the second terminal from the predetermined play address according to instruction of the control instruction sent by the server.

Optionally, in this embodiment, when it is instructed to play the predetermined multimedia content on the second terminal, the method may further include, but is not limited to: directly sending prompting information to the second terminal. The prompting information is used to prompt the second terminal that the current first terminal has switched the first application to run in the background, so that the second terminal switches a third application used for live broadcast of content running in the foreground of the first terminal to run in the background. The third application may be the first application, but a login account of the first terminal is different from that of the second terminal. Alternatively, the third application may be an application used for playing multimedia content, for example, a player. This is not limited in this embodiment.

Optionally, in this embodiment, detecting whether the first terminal switches the first application to run in the background may include, but is not limited to, at least one of the following manners:

(1) detecting whether instruction information sent by the first terminal instructs the first terminal to switch the first application to run in the background, and detecting that the first terminal switches the first application to run in the background if the instruction information instructs the first terminal to switch the first application to run in the background; or (2) detecting whether content that is sent by the first terminal and that is of an application currently running in the foreground is the content of the first application, and detecting that the first terminal switches the first application to run in the background if the content that is sent by the first terminal and that is of an application currently running in the foreground is not the content of the first application.

It should be noted that, the instruction information may include but is not limited to: an application identification of an application running in the foreground. The application identification may be an application name, an application version, and an application identifier (that is, application ID).

Figure 3A:
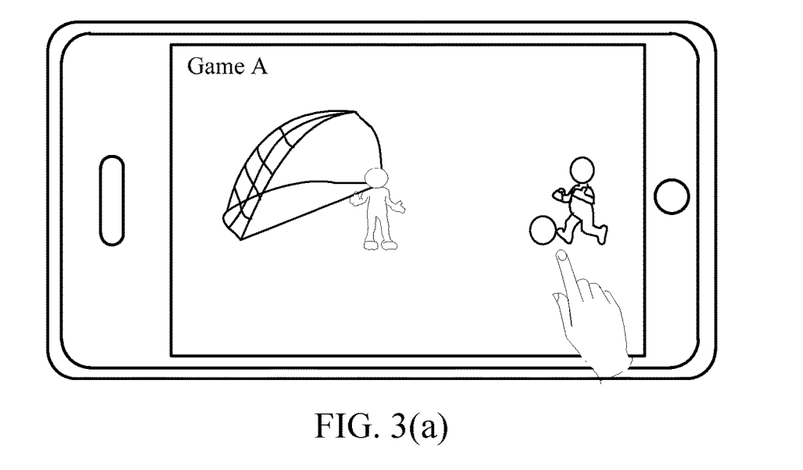
FIG. 3(a) is a schematic diagram of a first application of an optional live data broadcast method according to an embodiment of the present application.
Figure 3B:
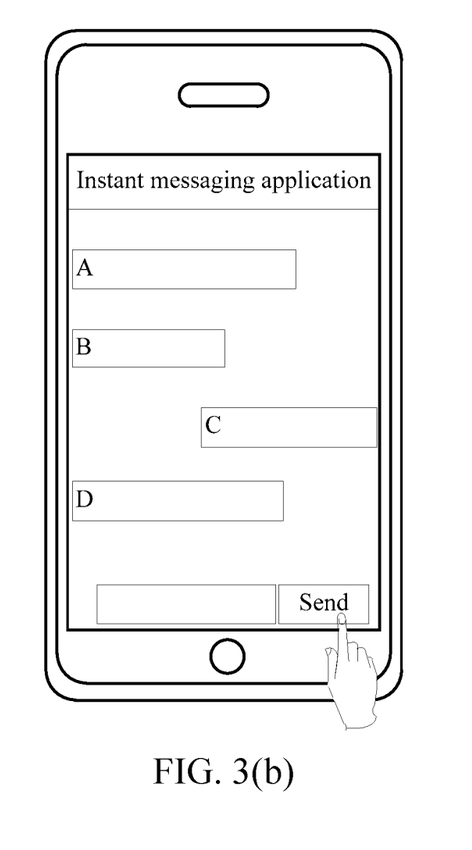
FIG. 3(b) is a schematic diagram of a second application of an optional live data broadcast method according to an embodiment of the present application.
Figure 3C:
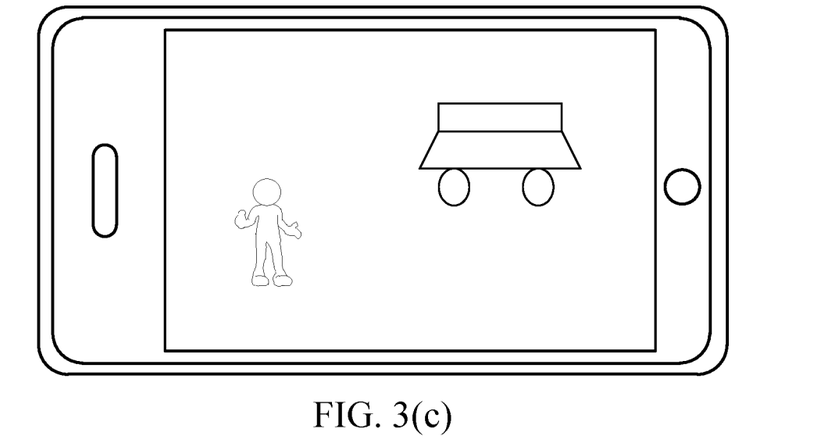
FIG. 3(c) is a schematic diagram of predetermined multimedia content in an optional live data broadcast method according to an embodiment of the present application.

Specifically, it is assumed that both the first terminal and the second terminal are mobile phones. For example, the first application is a mobile game such as game A, that is, the first terminal is performing live broadcast of the game A to the second terminal. Therefore, screens running in the foregrounds of both the first terminal and the second terminal are shown in FIG. 3(a). An application identification (that is, application ID) of the game A is A-1. If the server detects that the application identification (that is, application ID) in the instruction information sent by the first terminal sending is updated from A-1 to C-1, it indicates that the first terminal has switched the first application to run in the background, and has switched an application corresponding the application identification (that is, application ID) of C-1 to run in the foreground. It is assumed that the second application having the application identification (that is, application ID) of C-1 is an instant messaging application, as shown in FIG. 3(b), the second terminal plays the predetermined multimedia content shown in FIG. 3(c). The foregoing description is only an example, which is not limited in this embodiment.

Optionally, in this embodiment, after it is instructed to play the predetermined multimedia content on the second terminal, the method may further includes: continuing live broadcast of current content of the first application running in the foreground of the first terminal to the second terminal when it is detected that the first terminal switches the first application to run in the foreground, to flexibly switch live screens during the live data broadcast, thereby improving the smoothness of live data broadcast.

According to this embodiment of the present application, during live broadcast of content of a first application running in the foreground of the first terminal to a second terminal, a server detects, in real time, whether the first terminal switches the first application to run in the background, to instruct, in a timely manner, the second terminal to play predetermined multimedia content after detecting that the first terminal switches the first application to run in the background, so that the second terminal may replace a pause screen of the live first application or content of a second application running in the foreground of the first terminal by playing the predetermined multimedia content, thereby ensuring the smoothness of live broadcast after the live content is interrupted, and resolving the technical problem in the related technology that the smoothness of live broadcast is relatively poor after the live content is interrupted. In addition, because the second terminal plays the predetermined multimedia content rather than the content running in the foreground of the first terminal after the live content is interrupted, disclosure of personal information of a user of the first terminal when the live content is interrupted may be avoided, thereby increasing data security when the live content is interrupted.

In an optional solution, the instructing to play the predetermined multimedia content on the second terminal includes:

S1. Send the predetermined multimedia content to the second terminal for playing; or S2. Send a play address of the predetermined multimedia content to the second terminal; or S3. Send a control instruction to the second terminal, where the control instruction is used to instruct the second terminal to obtain the predetermined multimedia content from a predetermined play address.

It should be noted that, in this embodiment, the second terminal responds to the control instruction, and an obtained predetermined play address of the predetermined multimedia content may include but is not limited to one of the followings: the second terminal or a predetermined network device. The predetermined play address may, but is not limited to, be prestored in the second terminal. After receiving the control instruction, the second terminal obtains the corresponding predetermined multimedia content according to the prestored play address.

In an optional implementation, when instructing the second terminal to play the predetermined multimedia content, the server may directly push the predetermined multimedia content to the second terminal, so that the second terminal directly plays the received predetermined multimedia content. For example, the server directly pushes a video to the second terminal, and the second terminal may directly play the video to replace the content of the second application running in the foreground after the first terminal switches the first application to run in the background.

In another optional implementation, when instructing the second terminal to play the predetermined multimedia content, alternatively, the server may directly push the play address of the predetermined multimedia content to the second terminal, so that the second terminal obtains the corresponding predetermined multimedia content by tapping and accessing the play address after receiving the play address. For example, the second terminal receives a play address of http://1234.xxx.com/, the second terminal may obtain the predetermined multimedia content by accessing the play address, to replace the content of the second application running in the foreground after the first terminal switches the first application to run in the background.

In another optional implementation, when instructing the second terminal to play the predetermined multimedia content, alternatively, the server may send the control instruction to the second terminal, to inform the second terminal to obtain the predetermined multimedia content. For example, the second terminal sends the control instruction to instruct the second terminal to obtain the predetermined multimedia content from the predetermined play address, the second terminal may obtain the corresponding predetermined multimedia content from a prestored corresponding location, to replace the content of the second application running in the foreground after the first terminal switches the first application to run in the background.

According to this embodiment of this application, the second terminal is instructed to play the predetermined multimedia content by means of different manners, and the predetermined multimedia content is used to replace the content of the second application running in the foreground after the first terminal switches the first application to run in the background. The second terminal is instructed to play the predetermined multimedia content by means of different manners, to replace the pause screen of the first application on the first terminal or replace the content of the second application running in the foreground of the first terminal, thereby improving the smoothness of live data broadcast and avoiding visual aesthetic fatigue while ensuring the security of live data broadcast.

In an optional solution, before the predetermined multimedia content is sent to the second terminal for playing, the method further includes:

S1. Obtain the predetermined multimedia content locally; or

S2. Obtain the predetermined multimedia content from a predetermined network device.

Optionally, in this embodiment, obtaining the predetermined multimedia content by the server may include but is not limited to at least one of the followings: obtaining the predetermined multimedia content locally or obtaining the predetermined multimedia content from the predetermined network device. That is, the server may obtain prestored multimedia content locally, for example, a car advertisement shown in FIG. 3(c), and pushes the advertisement to the second terminal for playing, to replace the content of the second application running in the foreground after the first terminal switches the first application to run in the background.

It should be noted that, in this embodiment, the predetermined network device may include, but is not limited to, any network device. The server obtains the predetermined multimedia content by accessing the network device.

According to this embodiment of this application, before sending predetermined multimedia content to the second terminal for playing, the server may obtain the predetermined multimedia content by means of the foregoing manners. If the server obtains the predetermined multimedia content locally, the efficiency of obtaining the predetermined multimedia content by the server may be increased, and the efficiency of pushing the multimedia content by the server to the second terminal is further increased. In addition, if the server obtains the predetermined multimedia content from the predetermined network device, an audiovisual impression is brought to a user while improving user experience.

In an optional solution, after it is instructed to play the predetermined multimedia content on the second terminal, the method includes:

S1. Detect whether the first terminal switches the first application to run in the foreground.

S2. Perform live broadcast of current content of the first application running in the foreground to the second terminal if it is detected that the first terminal switches the first application to run in the foreground.

It should be noted that, in this embodiment, resuming live broadcast of the first application running in the first terminal to the second terminal may include, but is not limited to: directly resuming the live broadcast, or prompting the second terminal to resume the live broadcast. That is, the second terminal may directly switch the predetermined multimedia content to the content of the live first application in the first terminal. Specifically, for example, the predetermined multimedia content running in the foreground of the second terminal is disabled, and the content of the live first application in the first terminal is switched to run in the foreground of the second terminal. In addition, the second terminal may receive prompting information pushed by means of services, for example, prompting information used to prompt the user whether to resume the live broadcast of the content of the live first application in the first terminal, prompting information of "Resume the live broadcast or not?" shown in FIG. 4. Further, after receiving an instruction entered by the user and used to instruct to continue the live broadcast, the second terminal switches the content of the live first application in the first terminal to run in the foreground of the second terminal again.

According to this embodiment of this application, after the server detects that the first terminal switches the first application to run in the foreground again, live broadcast of current content of the first application running in the foreground of the first terminal to the second terminal is continued, so as to continue to watch the live broadcast on the second terminal, thereby switching different content flexibly and dynamically while ensuring the smoothness of live data broadcast.

In an optional solution, detecting whether the first terminal switches the first application to run in the background includes:

S1. Detect whether instruction information sent by the first terminal instructs the first terminal to switch the first application to run in the background, and detect that the first terminal switches the first application to run in the background if the instruction information instructs the first terminal to switch the first application to run in the background; or S2. Detect whether content that is sent by the first terminal and that is of an application currently running in the foreground is the content of the first application, and detect that the first terminal switches the first application to run in the background if the content that is sent by the first terminal and that is of an application currently running in the foreground is not the content of the first application.

It should be noted that, the instruction information may include but is not limited to: an application identification of an application running in the foreground. The application identification may be an application name, an application version, and an application identifier (that is, application ID). Specifically, it is assumed that an application identification (that is, application ID) of the first application is A-1, and an application identification (that is, application ID) of the second application is C-1, if the server learns from the instruction information sent by the first terminal that the application identification (that is, application ID) is updated from A-1 to C-1. That is, the server detects that the first terminal has switched the first application having the application identification of A-1 to run in the background, and has switched the second application having the application identification (that is, application ID) of C-1 to run in the foreground.

In addition, alternatively, the server may directly detect whether content that is sent by the first terminal and that is of an application currently running in the foreground is the content of the first application. For example, the first terminal sends a screen of the application running in the foreground of the first terminal, it may be detected that the first terminal has switched the first application to run in the background when it is learned that the content that is sent by the first terminal and that is of the application currently running in the foreground is not the content of the first application.

According to this embodiment of this application, whether content of an application currently running in the foreground of the first terminal is content of the first application is detected by means of the foregoing two manners. Further, it is determined, according to a detection result, whether the first terminal switches the first application to run in the background, to determine whether it is instructed to play predetermined multimedia content on the second terminal according to content that is detected by the first terminal and that runs in the foreground, so as to ensure that personal information of a user cannot be disclosed after live content of the first terminal is switched, thereby improving the security of live data broadcast.

In an optional solution, when it is instructed to play the predetermined multimedia content on the second terminal, the method includes:

S1. Prompt the second terminal to switch a third application configured to play the predetermined multimedia content to run in the background of the second terminal.

It should be noted that, in this embodiment, the third application may be the first application, but a login account of the first terminal is different from that of the second terminal. Alternatively, the third application may be an application used for playing multimedia content, for example, a player. This is not limited in this embodiment.

Optionally, in this embodiment, after the server detects that the first terminal switches the first application to run in the background, the method may include, but is not limited to, sending promoting information to the second terminal, where the prompting information is used to prompt the second terminal that the current first terminal has switched the first application to run in the background, so that the second terminal switches a third application used for live broadcast of content (that is, predetermined multimedia content) running in the foreground of the first terminal.

According to this embodiment of this application, when it is instructed to play predetermined multimedia content on the second terminal, it may also be prompted the second terminal to switch a third application used to play the predetermined multimedia content to run in the background of the second terminal, so that another content runs in the foreground of the second terminal, to increase the utilization rate of the play interface of the second terminal, and to avoid waste time in waiting for resuming the play.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are exemplary embodiments, and the related actions and modules are not necessarily mandatory to the present disclosure.

A person skilled in the art may clearly understand from the implementations described above that the method according to the embodiments may be implemented by using software and a necessary platform, or may be implemented by using hardware. However, in many cases, the former implementation is preferred. Based on such understanding, the technical solutions of the present disclosure substantially or the part contributing to the prior art may be implemented in a form of a software product. The software product is stored in a storage medium (for example, a read-only memory (ROM)/random access memory (RAM), a magnetic disk, or an optical disk), and includes several instructions for instructing a terminal device (which may be a mobile phone, a computer, a server, or a network device) to perform the methods described in the embodiments of the present application.

Embodiment 2

Figure 5:
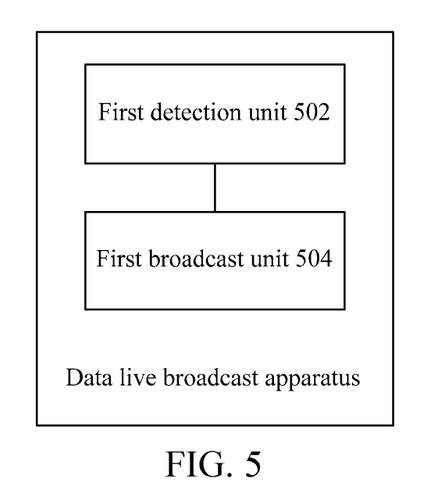
FIG. 5 is a schematic diagram of an optional live data broadcast apparatus according to an embodiment of the present application.

According to this embodiment of the present application, a live data broadcast apparatus configured to implement the live data broadcast method is provided. As shown in FIG. 5, the apparatus includes:

(1) a first detection unit 502, configured to detect, during live broadcast of content of a first application running in the foreground of a first terminal to a second terminal, whether the first terminal switches the first application to run in the background; and (2) a first play unit 504, configured to instruct to play predetermined multimedia content on the second terminal if it is detected that the first terminal switches the first application to run in the background, where the predetermined multimedia content is different from content of a second application running in the foreground after the first terminal switches the first application to run in the background.

Optionally, in this embodiment, the live data broadcast apparatus may, but is not limited to, be used to perform live broadcast of the content of the first application running in the foreground of the first terminal to the second terminal. As shown in FIG. 1, the server 104 detects, in real time, whether the first terminal (the terminal 102 in FIG. 1) switches the first application used for live broadcast to the background, to adjust, in a timely manner, content played on the second terminal (the terminal 106 in FIG. 1), so that the predetermined multimedia content is played on the second terminal to replace the content of the second application running in the foreground after the first terminal switches the first application, so as to resolve the problem in the related technology that the smoothness of live data broadcast is relatively poor caused by adoption of a related live data broadcast manner, thereby improving the smoothness during the live data broadcast.

It should be noted that, in this embodiment, in the related technology, during live broadcast of the content running in the foreground to the second terminal, the first terminal performs encoding and compression on the live content, and then provides, by using the server, the content to the second terminal for playing. That is, even though it is detected in the related technology that the first terminal switches the first application running in the foreground to run in the background, the second terminal still receives the content of the second application running in the foreground after the first terminal switches the first application, and continues live broadcast of the content of the second application running in the foreground of the first terminal. This may result in a problem that user information of the first terminal is disclosed to another user through the live broadcast. Therefore, in this embodiment, the server may instruct the second terminal to play predetermined multimedia data, to prevent the first terminal from disclosing the content of the second application running in the foreground to the second terminal, to ensure the security of live data broadcast.

Optionally, in this embodiment, the second application may include, but is not limited to: a system application, or a personal application. For example, the system application is a SMS application, and the personal application is an instant messaging application.

Optionally, in this embodiment, the predetermined multimedia content may include, but is not limited to, one of the followings: a predetermined image, a predetermined video, or predetermined audio. The predetermined multimedia content may be, but is not limited to, the content different from that of the first application. That is, the predetermined multimedia content is different from the content of the second application running in the foreground after the first terminal switches the first application, to avoid disclosure of information running in the foreground after the first terminal switches the first application to the background. Moreover, the predetermined multimedia content is different from the content of the first application, so that user experience may also be improved, to provide diversified selections for a user of the second terminal, so that the second terminal may perform smooth playing during live data broadcast.

Optionally, in this embodiment, the manner of instructing the second terminal to play the predetermined multimedia content includes at least one of the followings:

(1) sending the predetermined multimedia content to the second terminal for playing; or (2) sending a play address of the predetermined multimedia content to the second terminal; or (3) sending a control instruction to the second terminal, where the control instruction is used to instruct the second terminal to obtain the predetermined multimedia content from a predetermined play address.

That is, the predetermined multimedia content may, but is not limited to, be pushed by the server. A pushed data form may include at least one of the followings: directly pushed multimedia content or a play address of pushed multimedia content. The predetermined multimedia content may, but is not limited to, be directly obtained by the second terminal from the predetermined play address according to instruction of the control instruction sent by the server.

Optionally, in this embodiment, when it is instructed to play the predetermined multimedia content on the second terminal, the method may include, but is not limited to: directly sending prompting information to the second terminal. The prompting information is used to prompt the second terminal that the current first terminal has switched the first application to run in the background, so that the second terminal switches a third application used for live broadcast of content running in the foreground of the first terminal to run in the background. The third application may be the first application, but a login account of the first terminal is different from that of the second terminal. Alternatively, the third application may be an application used for playing multimedia content, for example, a player. This is not limited in this embodiment.

Optionally, in this embodiment, detecting whether the first terminal switches the first application to run in the background may include, but is not limited to, at least one of the following manners:

(1) detecting whether instruction information sent by the first terminal instructs the first terminal to switch the first application to run in the background, and detecting that the first terminal switches the first application to run in the background if the instruction information instructs the first terminal to switch the first application to run in the background; or (2) detecting whether content that is sent by the first terminal and that is of an application currently running in the foreground is the content of the first application, and detecting that the first terminal switches the first application to run in the background if the content that is sent by the first terminal and that is of an application currently running in the foreground is not the content of the first application.

It should be noted that, the instruction information may include but is not limited to: an application identification of an application running in the foreground. The application identification may be an application name, an application version, and an application identifier (that is, application ID).

Specifically, it is assumed that both the first terminal and the second terminal are mobile phones. For example, the first application is a mobile game such as game A, that is, the first terminal is performing live broadcast of the game A to the second terminal. Therefore, screens running in the foregrounds of both the first terminal and the second terminal as shown in FIG. 3(a). An application identification (that is, application ID) of the game A is A-1. If the server detects that the application identification (that is, application ID) in the instruction information sent by the first terminal sending is updated from A-1 to C-1, it indicates that the first terminal has switched the first application to run in the background, and has switched an application corresponding the application identification (that is, application ID) of C-1 to run in the foreground. It is assumed that the second application having the application identification (that is, application ID) of C-1 is an instant messaging application, as shown in FIG. 3(b), the second terminal plays the predetermined multimedia content shown in FIG. 3(c). The foregoing description is only an example, which is not limited in this embodiment.

Optionally, in this embodiment, after it is instructed to play the predetermined multimedia content on the second terminal, the method may further includes: continuing live broadcast of current content of the first application running in the foreground of the first terminal to the second terminal when it is detected that the first terminal switches the first application to run in the foreground, to flexibly switch live screens during the live data broadcast, thereby improving the smoothness of live data broadcast.

According to this embodiment of the present application, during live broadcast of content of a first application running in the foreground of the first terminal to a second terminal, a server detects, in real time, whether the first terminal switches the first application to run in the background, to instruct, in a timely manner, the second terminal to play predetermined multimedia content after detecting that the first terminal switches the first application to run in the background, so that the second terminal may replace a pause screen of the live first application or content of a second application running in the foreground of the first terminal by playing the predetermined multimedia content, thereby ensuring the smoothness of live broadcast after the live content is interrupted, and resolving the technical problem in the related technology that the smoothness of live broadcast is relatively poor after the live content is interrupted. In addition, because the second terminal plays the predetermined multimedia content rather than the content running in the foreground of the first terminal after the live content is interrupted, disclosure of personal information of a user of the first terminal when the live content is interrupted may be avoided, thereby increasing data security when the live content is interrupted.

In an optional solution, the first play unit 504 includes:

(1) a first sending module, configured to send the predetermined multimedia content to the second terminal for playing; or (2) a second sending module, configured to send a play address of the predetermined multimedia content to the second terminal; or (3) a third sending module, configured to send a control instruction to the second terminal, where the control instruction is used to instruct the second terminal to obtain the predetermined multimedia content from a predetermined play address.

It should be noted that, in this embodiment, the second terminal responds to the control instruction, and an obtained predetermined play address of the predetermined multimedia content may include but is not limited to one of the followings: the second terminal or a predetermined network device. The predetermined play address may, but is not limited to, be prestored in the second terminal. After receiving the control instruction, the second terminal obtains the corresponding predetermined multimedia content according to the prestored play address.

In an optional implementation, when instructing the second terminal to play the predetermined multimedia content, the server may directly push the predetermined multimedia content to the second terminal, so that the second terminal directly plays the received predetermined multimedia content. For example, the server directly pushes a video to the second terminal, and the second terminal may directly play the video to replace the content of the second application running in the foreground after the first terminal switches the first application to run in the background.

In another optional implementation, when instructing the second terminal to play the predetermined multimedia content, alternatively, the server may directly push the play address of the predetermined multimedia content to the second terminal, so that the second terminal obtains the corresponding predetermined multimedia content by tapping and accessing the play address after receiving the play address. For example, the second terminal receives a play address of http://1234.xxx.com/, the second terminal may obtain the predetermined multimedia content by accessing the play address, to replace the content of the second application running in the foreground after the first terminal switches the first application to run in the background.

In another optional implementation, when instructing the second terminal to play the predetermined multimedia content, alternatively, the server may send the control instruction to the second terminal, to inform the second terminal to obtain the predetermined multimedia content. For example, the second terminal sends the control instruction to instruct the second terminal to obtain the predetermined multimedia content from the predetermined play address, the second terminal may obtain the corresponding predetermined multimedia content from a prestored corresponding location, to replace the content of the second application running in the foreground after the first terminal switches the first application to run in the background.

According to the embodiments of this application, the second terminal is instructed to play the predetermined multimedia content by means of different manners, and the predetermined multimedia content is used to replace the content of the second application running in the foreground after the first terminal switches the first application to run in the background. The second terminal is instructed to play the predetermined multimedia content by means of different manners, to replace the pause screen of the first application on the first terminal or replace the content of the second application running in the foreground of the first terminal, thereby improving the smoothness of live data broadcast and avoiding visual aesthetic fatigue while ensuring the security of live data broadcast.

In an optional solution, the first play unit 504 further includes:

(1) an obtaining module, configured to: before the predetermined multimedia content is sent to the second terminal for playing, obtain the predetermined multimedia content locally; or obtain the predetermined multimedia content from a predetermined network device.

Optionally, in this embodiment, obtaining the predetermined multimedia content by the server may include but is not limited to at least one of the followings: obtaining the predetermined multimedia content locally or obtaining the predetermined multimedia content from the predetermined network device. That is, the server may obtain prestored multimedia content locally, for example, a car advertisement shown in FIG. 3(c), and pushes the advertisement to the second terminal for playing, to replace the content of the second application running in the foreground after the first terminal switches the first application to run in the background.

It should be noted that, in this embodiment, the predetermined network device may include, but is not limited to, any network device. The server obtains the predetermined multimedia content by accessing the network device.

According to this embodiment of this application, before sending predetermined multimedia content to the second terminal for playing, the server may obtain the predetermined multimedia content by means of the foregoing manners. If the server obtains the predetermined multimedia content locally, the efficiency of obtaining the predetermined multimedia content by the server may be increased, and the efficiency of pushing the multimedia content by the server to the second terminal is further increased. In addition, if the server obtains the predetermined multimedia content from the predetermined network device, an audiovisual impression is brought to a user while improving user experience.

In an optional solution, the apparatus further includes:

(1) a second detection module, configured to detect, after it is instructed to play the predetermined multimedia content on the second terminal, whether the first terminal switches the first application to run in the foreground; and (2) a second play unit, configured to perform live broadcast of current content of the first application running in the foreground to the second terminal if it is detected that the first terminal switches the first application to run in the foreground.

It should be noted that, in this embodiment, resuming live broadcast of the first application running in the first terminal to the second terminal may include, but is not limited to: directly resuming the live broadcast, or prompting the second terminal to resume the live broadcast. That is, the second terminal may directly switch the predetermined multimedia content to the content of the live first application in the first terminal. Specifically, for example, the predetermined multimedia content running in the foreground of the second terminal is disabled, and the content of the live first application in the first terminal is switched to run in the foreground of the second terminal. In addition, the second terminal may receive prompting information pushed by means of services, for example, prompting information used to prompt the user whether to resume the live broadcast of the content of the live first application in the first terminal, prompting information of "Resume the live broadcast or not?" shown in FIG. 4. Further, after receiving an instruction entered by the user and used to instruct to continue the live broadcast, the second terminal switches the content of the live first application in the first terminal to run in the foreground of the second terminal again.

According to this embodiment of this application, after the server detects that the first terminal switches the first application to run in the foreground again, live broadcast of current content of the first application running in the foreground of the first terminal to the second terminal is continued, so as to continue to watch the live broadcast on the second terminal, thereby switching different content flexibly and dynamically while ensuring the smoothness of live data broadcast.

In an optional solution, the first detection unit 502 includes:

(1) a first detection module, configured to: detect whether instruction information sent by the first terminal instructs the first terminal to switch the first application to run in the background, and detect that the first terminal switches the first application to run in the background if the instruction information instructs the first terminal to switch the first application to run in the background; or (2) a second detection module, configured to: detect whether content that is sent by the first terminal and that is of an application currently running in the foreground is the content of the first application, and detect that the first terminal switches the first application to run in the background if the content that is sent by the first terminal and that is of an application currently running in the foreground is not the content of the first application.

It should be noted that, the instruction information may include but is not limited to: an application identification of an application running in the foreground. The application identification may be an application name, an application version, and an application identifier (that is, application ID). Specifically, it is assumed that an application identification (that is, application ID) of the first application is A-1, and an application identification (that is, application ID) of the second application is C-1, if the server learns from the instruction information sent by the first terminal that the application identification (that is, application ID) is updated from A-1 to C-1. That is, the server detects that the first terminal has switched the first application having the application identification of A-1 to run in the background, and has switched the second application having the application identification (that is, application ID) of C-1 to run in the foreground.

In addition, alternatively, the server may directly detect whether content that is sent by the first terminal and that is of an application currently running in the foreground is the content of the first application. For example, the first terminal sends a screen of the application running in the foreground of the first terminal, it may be detected that the first terminal has switched the first application to run in the background when it is learned that the content that is sent by the first terminal and that is of the application currently running in the foreground is not the content of the first application.

According to this embodiment of this application, whether content of an application currently running in the foreground of the first terminal is content of the first application is detected by means of the foregoing two manners. Further, it is determined, according to a detection result, whether the first terminal switches the first application to run in the background, to determine whether it is instructed to play predetermined multimedia content on the second terminal according to content that is detected by the first terminal and that runs in the foreground, so as to ensure that personal information of a user of the first terminal cannot be disclosed, thereby improving the security of live data broadcast.

In an optional solution, the apparatus further includes:

(1) a prompting unit, configured to: prompt, when it is instructed to play the predetermined multimedia content on the second terminal, the second terminal to switch a third application configured to play the predetermined multimedia content to run in the background of the second terminal.

It should be noted that, in this embodiment, the third application may be the first application, but a login account of the first terminal is different from that of the second terminal. Alternatively, the third application may be an application used for playing multimedia content, for example, a player. This is not limited in this embodiment.

Optionally, in this embodiment, after the server detects that the first terminal switches the first application to run in the background, the method may include, but is not limited to, sending promoting information to the second terminal, where the prompting information is used to prompt the second terminal that the current first terminal has switched the first application to run in the background, so that the second terminal switches a third application used for live broadcast of content (that is, predetermined multimedia content) running in the foreground of the first terminal.

According to this embodiment of this application, when it is instructed to play predetermined multimedia content on the second terminal, it may also be prompted the second terminal to switch a third application used to play the predetermined multimedia content to run in the background of the second terminal, so that another content runs in the foreground of the second terminal, to increase the utilization rate of the play interface of the second terminal, and to avoid waste time in waiting for resuming the play.

Embodiment 3

In this embodiment, a live data broadcast method is described by using an example in which live content is a mobile football game running in a mobile phone. It should be noted that, the mobile phone and the mobile football game running in the mobile phone are only an example. This embodiment is not limited thereto. This embodiment may also be applied to another terminal, for example, a tablet computer, a notebook computer, or a PC, and be applied to another game application running in the another terminal.

Optionally, refer to the descriptions in Embodiment 1 and Embodiment 2 for an application scenario in this embodiment, and details are not described again in this embodiment.

A specific description is provided with reference to the following examples. For example, a game A shown in FIG. 3(a) is a mobile football game, and a first terminal performs live broadcast of content of the mobile football game currently running in the foreground to a second terminal. During the live broadcast, if a second application (for example, instant messaging application shown in FIG. 3(b)) in the first terminal receives a message sent by a close friend, a notification message used to indicate that the message is received is displayed in a notification bar of the first terminal. After detecting an instruction entered by a user and used to read the message, the first terminal switches the instant messaging application to run in the foreground, and switches the mobile football game to run in the background. At this time, the mobile football game switched to run in the background is paused, and an interface of the instant messaging application displayed on the first terminal is shown in FIG. 3(b).

Under the interface shown in FIG. 3(b), the first terminal may receive a message entered by the user, and sending the message to the close friend. After the first terminal switches the mobile football game to run in the background, the server detects, by means of interaction with the first terminal, that the first terminal switches the mobile football game to run in the background, to instruct to play predetermined multimedia content on the second terminal. For example, a car advertisement video prestored in the server is played on the second terminal, instead of playing a paused screen of the mobile football game, so that multimedia data except for the first application may be smoothly watched on the second terminal. This not only improves the smoothness of live data broadcast, but also ensures that personal information displayed on the instant messaging application running in the foreground cannot be disclosed after the first terminal switches the mobile football game to run in the background, thereby increasing the security of live data broadcast.

Figure 4:
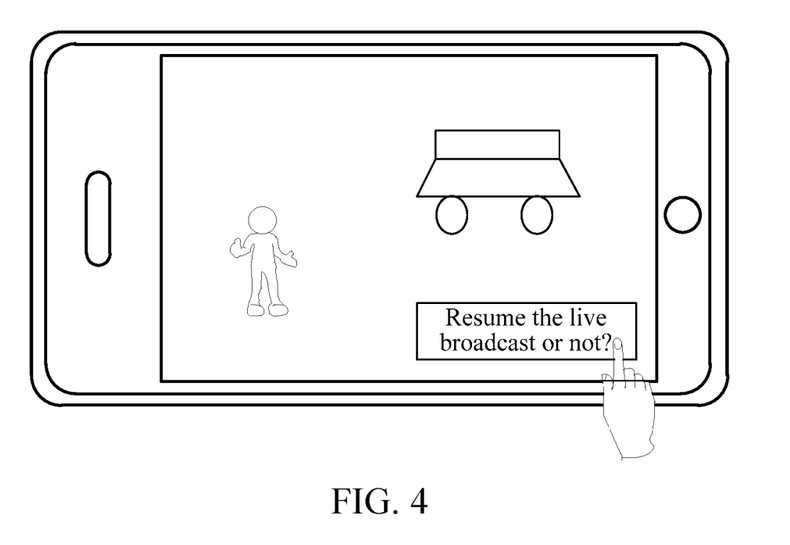
FIG. 4 is a schematic diagram of predetermined multimedia content in another optional live data broadcast method according to an embodiment of the present application.

Further, in a case in which the second terminal receives prompting information of "Resume the live broadcast or not?" shown in FIG. 4, it is detected whether the second terminal receives a control instruction entered by the user and used to resume the live broadcast. That is, at this time, the first terminal has switched the mobile football game to run in the foreground of the first terminal, and the first terminal may send, by using the server in a timely manner, a request of resuming the live broadcast or not to the second terminal, so that the second terminal may resume live broadcast of the mobile football game on the first terminal at the first opportunity. Further, after the second terminal detects a control instruction entered by the user and used to confirm resumption of live broadcast, the second terminal starts to continue live broadcast of the mobile football game running in the foreground of the first terminal, the interface shown in FIG. 3(a), and the second terminal starts to continue live broadcast from a video frame in which the mobile football game is interrupted, to avoid omission of live broadcast content. Content played on the second terminal is flexibly switched, to prevent the second terminal from being in a state in which resumption of the play is waited for a long time, thereby improving the smoothness of live data broadcast.

Embodiment 4

Figure 6:
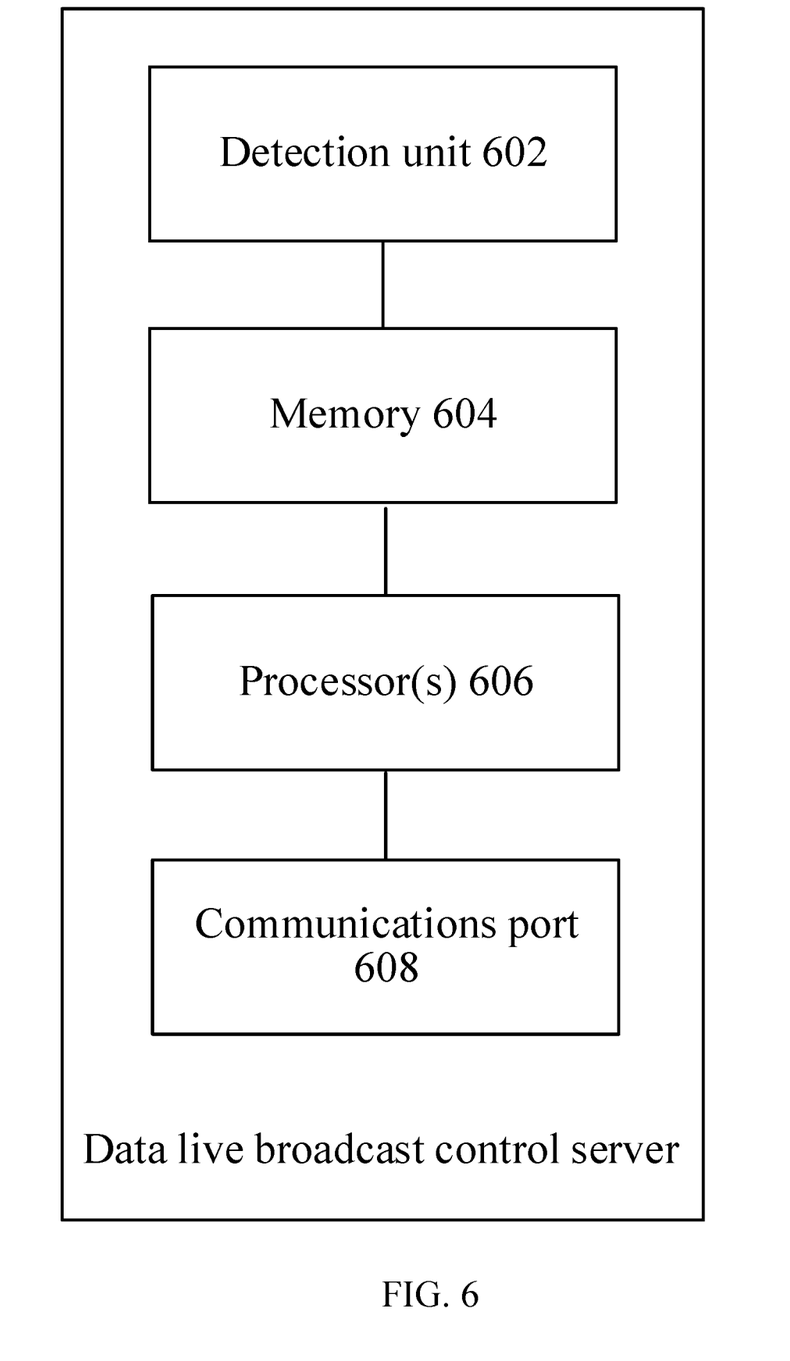
FIG. 6 is a schematic diagram of an optional live data broadcast control server according to an embodiment of the present application.

According to this embodiment of the present application, a live data broadcast control server configured to implement the live data broadcast method is provided. As shown in FIG. 6, the server includes:

(1) a detection apparatus 602, set to detect, during live broadcast of content of a first application running in the foreground of a first terminal to a second terminal, whether the first terminal switches the first application to run in the background; in some embodiments, the detection apparatus 602 corresponds to one or more programs executed by the live data broadcast control server;

(2) memory 604, set to store content of the first application currently running in the foreground of the first terminal and a plurality of programs for implementing the live data broadcast method described above;

(3) one or more processors 606, set to perform the plurality of programs for implementing the live data broadcast method described above including obtaining predetermined multimedia content to be played on the second terminal when it is detected that the first terminal switches the first application to run in the background, where the predetermined multimedia content is different from content of a second application running in the foreground after the first terminal switches the first application to run in the background; and (4) a communications port 608, set to communicate with the first terminal and the second terminal, respectively, in connection with implementing the live data broadcast method described above and instruct the second terminal to broad the predetermined multimedia content on the second terminal.

Optionally, refer to the examples described in Embodiment 1 and Embodiment 2 for a specific example of this embodiment, and details are not described again in this embodiment.

Embodiment 5

This embodiment of the present application further provides a storage medium configured to implement the live data broadcast method.

Optionally, in this embodiment, the storage medium may be located in at least one of network devices in a network of a mobile communications network, a wide area network, a metropolitan area network, or a local area network.

Optionally, in this embodiment, the storage medium is set to store program code used to perform the following steps:

S1. Detect, during live broadcast of content of a first application running in the foreground of a first terminal to a second terminal, whether the first terminal switches the first application to run in the background.

S2. Play predetermined multimedia content on the second terminal, where the predetermined multimedia content is different from content of a second application running in the foreground after the first terminal switches the first application to run in the background.

Optionally, in this embodiment, the storage medium is further set to store program code used to perform the following steps: sending the predetermined multimedia content to the second terminal for playing; or sending a play address of the predetermined multimedia content to the second terminal; or sending a control instruction to the second terminal, where the control instruction is used to instruct the second terminal to obtain the predetermined multimedia content from a predetermined play address.

Optionally, in this embodiment, the storage medium is further set to store program code used to perform the following steps: obtaining the predetermined multimedia content locally before the predetermined multimedia content is sent to the second terminal for playing; or obtaining the predetermined multimedia content from a predetermined network device before the predetermined multimedia content is sent to the second terminal for playing.

Optionally, in this embodiment, the storage medium is further set to store program code used to perform the following steps:

S1. Detect, after it is instructed to play the predetermined multimedia content on the second terminal, whether the first terminal switches the first application to run in the foreground.

S2. Perform live broadcast of current content of the first application running in the foreground to the second terminal if it is detected that the first terminal switches the first application to run in the foreground.

Optionally, in this embodiment, the storage medium is further set to store program code used to perform the following steps: detecting whether an instruction information sent by the first terminal instructs the first terminal to switch the first application to run in the background, and detecting that the first terminal switches the first application to run in the background if the instruction information instructs the first terminal to switch the first application to run in the background; or detecting whether content that is sent by the first terminal and that is of an application currently running in the foreground is the content of the first application, and detecting that the first terminal switches the first application to run in the background if the content that is sent by the first terminal and that is of an application currently running in the foreground is not the content of the first application.

Optionally, in this embodiment, the foregoing storage medium may include but is not limited to: any non-transitory computer readable storage medium that can store program code, such as a USB flash drive, a read-only memory (ROM), a random access memory (RAM), a removable hard disk, a magnetic disk, or an optical disc.

Optionally, refer to the examples described in Embodiment 1 and Embodiment 2 for a specific example of this embodiment, and details are not described again in this embodiment.

The sequence numbers of the foregoing embodiments of the present application are merely for illustrative purposes, and are not intended to indicate priorities of the embodiments.

When the integrated unit in the foregoing embodiments is implemented in the form of a software functional unit and sold or used as an independent product, the integrated unit may be stored in a computer-readable storage medium. Based on such understanding, the technical solutions of the present disclosure substantially, or the part contributing to the related technology, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present application.

In the foregoing embodiments of the present application, the description of each embodiment has respective focuses. For a part that is not described in detail in an embodiment, reference may be made to related descriptions in other embodiments.

In the several embodiments provided in this application, it should be understood that the disclosed client may be implemented in other manners. The described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. Indirect couplings or communication connections between the units or modules may be implemented in electrical, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The foregoing is merely description of preferred implementations of the present disclosure. It should be noted that, a person of ordinary skills in the art may make several improvements and modifications without departing from the principles of the present disclosure. The improvements and the modifications shall fall within the protection scope of the present disclosure.

INDUSTRIAL APPLICABILITY

In the embodiments of the present application, during live broadcast of content of a first application running in the foreground of the first terminal to a second terminal, a server detects, in real time, whether the first terminal switches the first application to run in the background, to instruct, in a timely manner, the second terminal to play predetermined multimedia content after detecting that the first terminal switches the first application to run in the background, so that the second terminal may replace a pause screen of the live first application or content of a second application running in the foreground of the first terminal by playing the predetermined multimedia content, thereby ensuring the smoothness of live broadcast after the live content is interrupted, and resolving the technical problem that the smoothness of live broadcast is relatively poor after the live content is interrupted.

What is claimed is:

1. A live data broadcast method performed at a computer server having one or more processors and memory storing a plurality of programs to be executed by the processors, wherein the computer server is communicatively coupled to a first terminal associated with a first user account of a social networking application and a second terminal associated with a second user account of the social networking application, the method comprising:

receiving, from the second user account at the second terminal, a first user request for live broadcasting content from the social networking application running on the first terminal to the second user account on the second terminal;

in accordance with a determination that the first user account and the second user account are on each other's contact list of the social networking application:
  receiving, from the first terminal, live broadcast of the content from the social networking application running in the foreground; and
  transmitting the content received from the first terminal to the second terminal for displaying on the second terminal;

detecting, during the live broadcast of the content of the social networking application running in the foreground of the first terminal to the second terminal, that the first terminal switches the social networking application to run in a background of the first terminal;

obtaining predetermined multimedia content associated with the live broadcast;

sending instructions to the second terminal to suspend the live broadcast of content from the social networking application running on the first terminal to the second terminal and play the predetermined multimedia content on the second terminal, the predetermined multimedia content being different from content of a first application running in the foreground of the first terminal; and communicating status updates related to the live broadcast with the first terminal and the second terminal, respectively, further including:
  detecting, from the first terminal, a first status update that the social networking application is switched back to run in the foreground;
  transmitting, to the second terminal, a second status update to prompt the second terminal to resume the live broadcast of the content from the social networking application running on the first terminal to the second user on the second terminal; and
  in response to a second user request to resume the live broadcast of the content from the social networking application running on the first terminal to the second user account on the second terminal, resuming transmitting the content received from the first terminal to the second terminal for displaying on the second terminal.

2. The method according to claim 1, wherein the operation of sending instructions to the second terminal to play the predetermined multimedia content on the second terminal comprises:
sending the predetermined multimedia content to the second terminal for playing; or
sending a play address of the predetermined multimedia content to the second terminal; or
sending a control instruction to the second terminal, wherein the control instruction is used to instruct the second terminal to obtain the predetermined multimedia content from a predetermined play address.

3. The method according to claim 1, wherein the operation of communicating status updates related to the live broadcast with the first terminal and the second terminal, respectively, comprises:
sending, to the first terminal, a status query for an estimated remaining duration of the first application;
receiving, from the first terminal, a response to the status query; and
sending, to the second terminal, a status update according to the response, the status update indicating when the live broadcast is expected to be resumed.

4. The method according to claim 3, wherein the response to the status query is derived from, at least, past user activities associated with the first application running in the foreground of the first terminal.

5. The method according to claim 1, wherein the operation of detecting that the first terminal switches the social networking application to run in the background comprises:
detecting instruction information sent by the first terminal instructing the first terminal to switch the social networking application to run in the background; or
detecting that content that is sent by an application currently running in the foreground is not different from the content of the social networking application.

6. The method according to claim 1, wherein the predetermined multimedia content is different from the content of the social networking application.

7. The method according to claim 1, wherein the predetermined multimedia content comprises at least one of the followings: a predetermined image, a predetermined video, and predetermined audio.

8. The method according to claim 1, wherein the status updates related to the live broadcast are exchanged repeatedly between the first terminal and the second terminal until the live broadcast is resumed or the live broadcast is terminated by one of the first terminal and the second terminal.

9. A computer server for performing live data broadcast between a first terminal associated with a first user account of a social networking application and a second terminal associated with a second user account of the social networking application, wherein the first terminal and the second terminal are communicatively coupled to the computer server, the computer server comprising:
one or more processors;
memory; and
a plurality of programs stored in the memory that, when executed by the processors, cause the computer server to perform a plurality of operations including:
receiving, from the second user account at the second terminal, a first user request for live broadcasting content from the social networking application running on the first terminal to the second user account on the second terminal;
in accordance with a determination that the first user account and the second user account are on each other's contact list of the social networking application:
receiving, from the first terminal, live broadcast of the content from the social networking application running in the foreground; and
transmitting the content received from the first terminal to the second terminal for displaying on the second terminal;
detecting, during the live broadcast of the content of the social networking application running in the foreground of the first terminal to the second terminal, that the first terminal switches the social networking application to run in a background of the first terminal;
obtaining predetermined multimedia content associated with the live broadcast;
sending instructions to the second terminal to suspend the live broadcast of content from the social networking application running on the first terminal to the second terminal and play the predetermined multimedia content on the second terminal, the predetermined multimedia content being different from content of a first application running in the foreground of the first terminal; and
communicating status updates related to the live broadcast with the first terminal and the second terminal, respectively, further including:
detecting, from the first terminal, a first status update that the social networking application is switched back to run in the foreground;
transmitting, to the second terminal, a second status update to prompt the second terminal to resume the live broadcast of the content from the social networking application running on the first terminal to the second user on the second terminal; and
in response to a second user request to resume the live broadcast of the content from the social networking application running on the first terminal to the second user account on the second terminal, resuming transmitting the content received from the first terminal to the second terminal for displaying on the second terminal.

10. The computer server according to claim 9, wherein the operation of sending instructions to the second terminal to play the predetermined multimedia content on the second terminal comprises:
sending the predetermined multimedia content to the second terminal for playing; or
sending a play address of the predetermined multimedia content to the second terminal; or
sending a control instruction to the second terminal, wherein the control instruction is used to instruct the second terminal to obtain the predetermined multimedia content from a predetermined play address.

11. The computer server according to claim 9, wherein the operation of communicating status updates related to the live broadcast with the first terminal and the second terminal, respectively, comprises:
sending, to the first terminal, a status query for an estimated remaining duration of the first application;
receiving, from the first terminal, a response to the status query; and sending, to the second terminal, a status update according to the response, the status update indicating when the live broadcast is expected to be resumed.

12. The computer server according to claim 11, wherein the response to the status query is derived from, at least, past user activities associated with the first application running in the foreground of the first terminal.

13. The computer server according to claim 9, wherein the operation of detecting that the first terminal switches the social networking application to run in the background comprises:
  detecting instruction information sent by the first terminal instructing the first terminal to switch the social networking application to run in the background; or
  detecting that content that is sent by an application currently running in the foreground is not different from the content of the social networking application.

14. The computer server according to claim 9, wherein the predetermined multimedia content is different from the content of the social networking application.

15. The computer server according to claim 9, wherein the predetermined multimedia content comprises at least one of the followings: a predetermined image, a predetermined video, and predetermined audio.

16. The computer server according to claim 9, wherein the status updates related to the live broadcast are exchanged repeatedly between the first terminal and the second terminal until the live broadcast is resumed or the live broadcast is terminated by one of the first terminal and the second terminal.

17. A non-transitory computer readable storage medium in connection with a computer server having one or more processors for performing a live data broadcast between a first terminal associated with a first user account of a social networking application and a second terminal associated with a second user account of the social networking application, wherein the first terminal and the second terminal are communicatively coupled to the computer server, the storage medium being set to store a plurality of programs to perform the following operations:
  receiving, from the second user account at the second terminal, a first user request for live broadcasting content from the social networking application running on the first terminal to the second user account on the second terminal;
  in accordance with a determination that the first user account and the second user account are on each other's contact list of the social networking application:
    receiving, from the first terminal, live broadcast of the content from the social networking application running in the foreground; and
    transmitting the content received from the first terminal to the second terminal for displaying on the second terminal;
  detecting, during the live broadcast of the content of the social networking application running in the foreground of the first terminal to the second terminal, that the first terminal switches the social networking application to run in a background of the first terminal;
  obtaining predetermined multimedia content associated with the live broadcast;
  sending instructions to the second terminal to suspend the live broadcast of content from the social networking application running on the first terminal to the second terminal and play the predetermined multimedia content on the second terminal, the predetermined multimedia content being different from content of a first application running in the foreground of the first terminal; and
  communicating status updates related to the live broadcast with the first terminal and the second terminal, respectively, further including:
    detecting, from the first terminal, a first status update that the social networking application is switched back to run in the foreground;
    transmitting, to the second terminal, a second status update to prompt the second terminal to resume the live broadcast of the content from the social networking application running on the first terminal to the second user on the second terminal; and
    in response to a second user request to resume the live broadcast of the content from the social networking application running on the first terminal to the second user account on the second terminal, resuming transmitting the content received from the first terminal to the second terminal for displaying on the second terminal.

18. The non-transitory computer readable storage medium according to claim 17, wherein the operation of communicating status updates related to the live broadcast with the first terminal and the second terminal, respectively, comprises:
  sending, to the first terminal, a status query for an estimated remaining duration of the first application;
  receiving, from the first terminal, a response to the status query; and
  sending, to the second terminal, a status update according to the response, the status update indicating when the live broadcast is expected to be resumed.

* * * * *